United States Patent
Ihara et al.

(10) Patent No.: US 8,394,300 B2
(45) Date of Patent: Mar. 12, 2013

(54) MANUFACTURING METHOD OF OPTICAL GOODS

(75) Inventors: Masaki Ihara, Minowa-machi (JP);
Toru Saito, Minowa-machi (JP);
Akinori Yamamoto, Minowa-Machi (JP)

(73) Assignee: Seiko Epson Corporation, Tokyo (JP)

( * ) Notice: Subject to any disclaimer, the term of this patent is extended or adjusted under 35 U.S.C. 154(b) by 701 days.

(21) Appl. No.: 12/336,906

(22) Filed: Dec. 17, 2008

(65) Prior Publication Data

US 2009/0155453 A1   Jun. 18, 2009

(30) Foreign Application Priority Data

Dec. 17, 2007 (JP) ................................ 2007-324532
Oct. 8, 2008 (JP) ................................ 2008-261564

(51) Int. Cl.
  *B29D 11/00* (2006.01)
  *B29C 45/00* (2006.01)
  *G05D 24/00* (2006.01)
  *G05D 11/12* (2006.01)

(52) U.S. Cl. ........................ 264/1.1; 264/328.17; 137/92

(58) Field of Classification Search ........................ None
See application file for complete search history.

(56) References Cited

U.S. PATENT DOCUMENTS

| | | | | |
|---|---|---|---|---|
| 3,642,402 A | * | 2/1972 | Hutchinson et al. | 425/144 |
| 5,317,908 A | * | 6/1994 | Fitzgerald et al. | 73/54.26 |
| 6,294,122 B1 | * | 9/2001 | Moss et al. | 264/328.9 |
| 6,727,096 B1 | * | 4/2004 | Wang et al. | 436/37 |
| 2004/0161490 A1 | * | 8/2004 | Babin et al. | 425/564 |
| 2004/0178526 A1 | * | 9/2004 | Kojima et al. | 264/1.32 |
| 2004/0254258 A1 | | 12/2004 | Horikoshi et al. | |
| 2007/0149639 A1 | | 6/2007 | Horikoshi et al. | |
| 2009/0156781 A1 | * | 6/2009 | Ihara et al. | 528/375 |

FOREIGN PATENT DOCUMENTS

| JP | 2004-137481 | 5/2004 |
|---|---|---|
| JP | 2005-081772 | 3/2005 |

OTHER PUBLICATIONS

Zhu Qing, "Correlation of Average Polymerization Degree and Viscosity of Polyvinyl Alcohol" Chemical Division of Shinghai petrochemical Company Ltd, vol. 3, pp. 27-29, 2005 (with English abstract).

* cited by examiner

*Primary Examiner* — Christina Johnson
*Assistant Examiner* — Benjamin Schiffman
(74) *Attorney, Agent, or Firm* — DLA Piper LLP (US)

(57) ABSTRACT

A manufacturing method of optical goods, including: injecting a material composition stored in a tank into a cavity provided inside a mold; and polymerizing and curing the injected material composition, in which a viscosity of the material composition stored in the tank is measured.

4 Claims, 1 Drawing Sheet

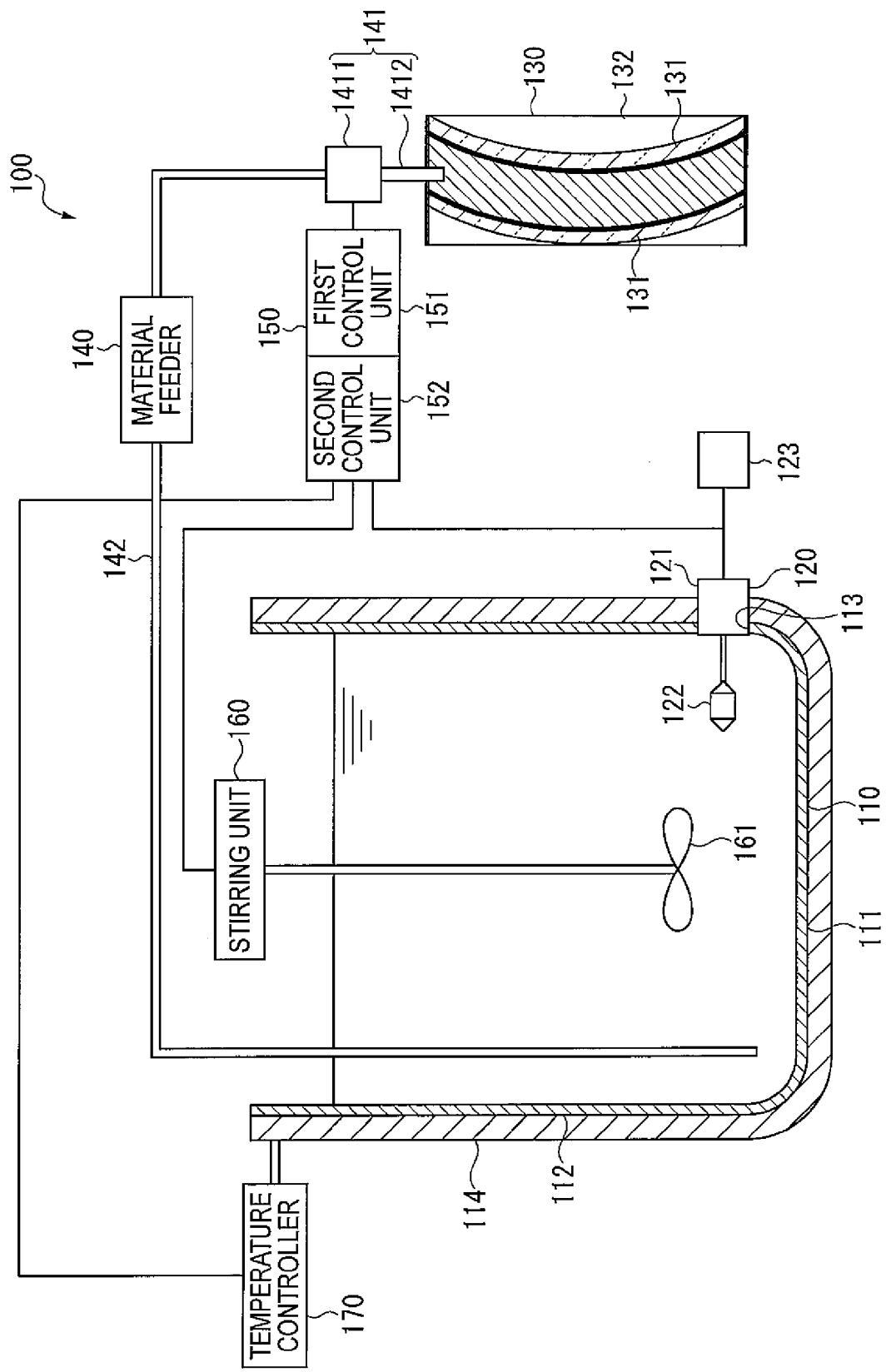

MANUFACTURING METHOD OF OPTICAL GOODS

The entire disclosure of Japanese Patent Application No. 2007-324532, filed Dec. 17, 2007 and No. 2008-261564, filed Oct. 8, 2008 is expressly incorporated by reference herein.

BACKGROUND

1. Technical Field

The present invention relates to a manufacturing method and a manufacturing apparatus of optical goods such as a plastic lens.

2. Related Art

Traditionally, optical goods such as plastic lenses are manufactured by mixing a plurality of materials, injecting the mixture (referred to as a material composition hereinafter) into a mold and polymerizing the material composition within the mold. In order to manufacture optical goods of a constant quality, the progress of the polymerization reaction of the material composition is preferably controlled.

For instance, Document 1 (JP-A-2004-137481) discloses a preliminary reaction and deaeration processing that are conducted before a material composition is injected into a mold, where the progress of the reaction is detected by measuring a refractive index of a reacting composition. Specifically, an in-line refractometer is attached to a blend tank in which the preliminary reaction and the deaeration processing are conducted and a detector portion of the refractometer is always immersed in the reacting composition, so that the refractive index of reaction product is measured and monitored to control the progress of the blending operation.

Further, a usable time (referred to as a pot life hereinafter) after completion of the blending is designated for the material composition based on a result of an experiment in advance. The material composition that ran over the designated time is discarded.

However, when the material composition is managed based solely on the previously determined pot life irrespective of the condition of the material composition, the material composition may be used even after the condition of the material composition is degraded for some reasons, thereby deteriorating the quality of the manufactured plastic lens. On the other hand, even when the designated pot life of the material composition is elapsed, the material composition may still be usable in some cases. In such cases, the material is wasted.

SUMMARY

An object of the invention is to provide a manufacturing method and a manufacturing apparatus of optical goods capable of controlling a pot life of a material composition in accordance with the condition of the composition and, consequently, capable of reducing a production cost.

A manufacturing method of optical goods according to an aspect of the invention includes: injecting a material composition stored in a tank into a cavity provided inside a mold; and polymerizing and curing the injected material composition, in which a viscosity of the material composition stored in the tank is measured.

According to the aspect of the invention, after blending the material composition stored in the tank, the material composition is fed into the mold. A blending step of the material composition, a deaeration step and the like can be conducted in the tank. Additionally, a preliminary reaction and a cooling step may be conducted in accordance with the properties of the material. The viscosity of the material composition in the tank is also directly measured during the respective steps.

Accordingly, a pot life (or whether the material composition can be used or not) can be determined in accordance with the viscosity of the material composition that is actually used. For instance, even when a long time has passed after preparing the material composition, if the viscosity of the material composition proves to be in an admissible range, the material composition can still be put in use. In other words, it is only necessary that the material composition is discarded when the viscosity of the material composition exceeds a certain value. Specifically, since the pot life has been managed based solely on a previously determined time in a traditional arrangement, the material may be wasted or a degraded material composition may be put into use. However, according to the aspect of the invention, the material can be efficiently used, a material cost can be reduced and a discharge amount of the discarded material can be restrained while providing high quality optical goods.

In the manufacturing method of optical goods of the above aspect of the invention, the viscosity is preferably measured by a viscometer having a detector immersed in the material composition stored in the tank.

According to the above arrangement, since the detector of the viscometer is immersed in the material composition in the tank, the viscosity of the material composition in the tank can be constantly measured. As a result, the viscosity of the material composition during preparation or on the way of reaction can be constantly monitored. Accordingly, since the control process can be conducted on the basis of the viscosity at each moment, the material composition can be more securely reacted, so that high quality optical goods can be provided.

In the manufacturing method of optical goods of the above aspect of the invention, whether the material composition is injected into the cavity or not is preferably determined in accordance with the viscosity.

According to the above arrangement, whether the material composition should be injected or not is judged based on the viscosity of the material composition in the tank. It is especially preferable that the viscosity immediately before being injected into the cavity is measured.

Specifically, when the viscosity of the material composition is within a permissible range, it is judged that the material composition can be used and the material composition is injected into the cavity. On the other hand, when the viscosity exceeds a certain value, the quality of the product will be degraded, so the material composition is not used.

When the viscosity of the material composition immediately before being injected into the cavity is to be lowered, the material composition is preferably heated by a heater to allow smooth injection of the material composition into the cavity.

In the manufacturing method of optical goods of the above aspect of the invention, stirring of the material composition stored in the tank is preferably controlled in accordance with the viscosity.

Since the viscosity of the material composition in the tank is constantly measured and monitored, the stirring of the material composition in the tank can be controlled in accordance with the viscosity. Specifically, when the viscosity is large, in order to uniformly promote the reaction, the stirring speed is raised. However, when the stirring speed is excessively raised in the deaeration reaction step and the like, air bubbles may be engulfed or emerged on the surface of the material composition. Accordingly, it is necessary to control the stirring speed in accordance with the respective steps.

Further, when the viscosity of the material composition has reached a certain level, it is possible to stop stirring and advance to the next step.

Since the stirring is controlled in accordance with the viscosity of the material composition in the tank, the reaction can be securely progressed. Accordingly, high quality optical goods can be more reliably manufactured. Further, since it is unlikely that the reaction is excessively progressed in error, the material is hardly wasted, thus reducing the material cost.

In the manufacturing method of optical goods of the above aspect of the invention, a temperature of the material composition stored in the tank is preferably controlled in accordance with the viscosity.

Since the viscosity of the material composition in the tank is constantly measured and monitored, the temperature of the material composition can be controlled in accordance with the viscosity. Specifically, when the viscosity of the material composition is abruptly increased on account of abnormal reaction of the material composition, it is possible to lower the temperature to restrain the progress of the abnormal reaction.

Since the temperature is controlled in accordance with the viscosity of the material composition in the tank, the reaction can be reliably progressed. Accordingly, high quality optical goods can be more reliably manufactured. Further, since it is unlikely that the reaction is excessively progressed in error, the material is hardly wasted, thus reducing the material cost.

A manufacturing apparatus of optical goods according to another aspect of the invention includes: a tank; an injector that injects a material composition stored in the tank into a cavity provided inside a mold; and a viscometer that measures a viscosity of the material composition stored in the tank and has a detector immersed in the material composition stored in the tank.

According to the above aspect of the invention, since the detector of the viscometer is immersed in the material composition in the tank, the viscosity of the material composition in the tank can be constantly measured. Then, the viscosity of the material composition in the tank is displayed on a display device for displaying a measured value detected by the viscometer.

Accordingly, the viscosity of the material composition in the tank can be constantly monitored, thus achieving the above advantages.

BRIEF DESCRIPTION OF THE DRAWINGS

The invention will be described with reference to the accompanying drawing.

FIG. 1 is a schematic illustration of a manufacturing apparatus of optical goods according to an exemplary embodiment of the invention.

DESCRIPTION OF EXEMPLARY EMBODIMENT(S)

An exemplary embodiment of a manufacturing apparatus for manufacturing optical goods according to the invention will be described below in detail with reference to an attached drawing.

Arrangement of Manufacturing Apparatus

FIG. 1 is a schematic illustration of the manufacturing apparatus of optical goods according to the exemplary embodiment of the invention.

As shown in FIG. 1, a manufacturing apparatus 100 includes: a tank 110 for storing a resin material; a viscometer 120 for measuring a viscosity of a material composition generated by a reaction of the resin material within the tank 110; a mold 130 for polymerizing and curing the material composition; a material feeder 140 for feeding the material composition from the tank 110 into the mold 130; and a controller 150 for controlling the supply of the material composition and the progress of the reaction.

The tank 110 is a substantially cylindrical container having a bottom side 111 and a wall 112 vertically erected from the bottom side 111. An attachment hole 113 for attaching the viscometer 120 is provided on a part of the wall 112 adjacent to the bottom side 111. It is preferable that the tank 110 is provided with a temperature controller 170 for controlling the material composition using a water jacket 114 and the like and a stirring unit 160 for stirring the resin composition with a stirring vane 161 and the like.

The viscometer 120 includes a body 121 fitted into the attachment hole 113, a detector 122 provided on an end of the body 121 for detecting the viscosity of the material composition and a display device 123 for displaying a measurement value of the detector 122. An interspace between the body 121 and the attachment hole 113 are sealed so that the material inside the tank 110 is not leaked to the outside. The detector 122 is immersed in the material composition (or material) in the tank 110. The display device 123 is connected to the body 121 to display the viscosity detected by the detector 122 after numeric conversion.

Commercially available viscometer may be suitably used as the viscometer 120. For instance, an in-line viscometer such as a shielded viscometer "FVM80A-ST" (trade name) manufactured by CBC Co. Ltd. can be suitably used.

The mold 130 is provided by a pair of lens molds 131 and a tape 132 wound around a periphery of the lens molds 131.

The material feeder 140 includes a dispenser 141 for injecting the material composition into the mold 130 and a material supply tube 142 of which a first end is connected to a base end of the dispenser 141. A second end of the material supply tube 142 is immersed in the material composition in the tank 110. The dispenser 141 includes a body section 1411 for adjusting the injection of the material composition and a nozzle 1412 for discharging the material composition.

The controller 150 includes a first control unit 151 for controlling a process for injecting the material composition into the mold 130 and a second control unit 152 for controlling the progress of the reaction and annexed units in accordance with the viscosity of the material composition in the tank 110.

The first control unit 151 regulates an injection amount of the material composition from the dispenser 141 and the flow rate of the material composition circulating in the material supply tube 142, and detects that the material composition is injected into the mold 130 at a predetermined level.

The second control unit 152 controls the temperature of the water jacket 114 based on the measurement value measured by the viscometer 120 using the stirring unit 160 and the temperature controller 170.

Further, the second control unit 152 judges whether the material composition can be injected into the mold 130 or not based on the viscosity of the material composition. When the viscosity of the material composition is adapted for injection, the material composition is injected into the mold 130. On the other hand, when the viscosity exceeds a predetermined threshold, since the quality of the material composition degrades, the material composition is not injected into the mold 130 and is thus not used.

Material

In the invention, typically used material of optical goods can be used. Examples of usable materials are: (meth)acrylic resin; styrene resin; polycarbonate resin; allyl resin; allyl carbonate resin such as diethylene glycol bis(allyl carbonate) resin (CR-39); vinyl resin; polyester resin; polyether resin; urethane resin obtained by reacting isocyanate compound and hydroxy compound such as diethylene glycol; thio-urethane resin obtained by reacting isocyanate compound and polythiol compound; thioepoxy resin obtained by polymerizing polymerizable compounds containing (thio)epoxy group; and a resin obtained by polymerizing polymerizable compositions containing (thio)epoxy compound having at least one disulfide link in a molecule. In this exemplary embodiment, thiourethane resin is used.

A polymerization catalyst and other additives may be added as necessary. Examples of the polymerization catalyst includes amines, phosphines, quaternary ammonium salts, quaternary phosphonium salts, condensation products of aldehyde and amine compound, salts of carboxylic acid and ammonium, urethanes, thiourethanes, guanidines, thioureas, thiazoles, sulfenamides, thiurams, di-thiocarbonate salts, xanthic acid salts, tertiary sulfonium acid salts, binary iodonium salts, mineral acids, Lewis acids, organic acids, silicates, tetrafluoroboric acids, peroxides, azo compounds and acid phosphate esters.

Manufacturing Method of Optical Goods

Next, a manufacturing method of the optical goods by the manufacturing apparatus 100 will be described below.

Initially, the material composition is prepared in the tank 110. Specifically, necessary amount of a polymerizable material selected from various monomers and oligomers is weighed and is loaded into the tank 110. Two or more polymerizable materials may be used as necessary. After loading the one or more polymerizable material(s) is thrown into the tank 110, the water jacket 114 is controllably operated by the temperature controller 170 to adjust the temperature of the tank 110 at an appropriate level. Subsequently, the loaded material composition is sufficiently stirred so that the material composition is evenly distributed. At this time, additives such as a mold lubricant, an ultraviolet absorber, a light stabilizer, an antioxidant, a cross-linking agent and bluing agent may be added as necessary.

The tank temperature when the material composition is stirred is typically −10 to 80 degrees Celsius and more preferably is 0 to 40 degrees Celsius. If the material composition is stirred at an excessively high temperature, polymerization reaction may be started at an early stage or the material composition may be yellowed. On the other hand, when the material composition is stirred at an excessively low temperature, powder (solid) polymerizable material or powder (solid) additives such as ultraviolet absorber may not be dissolved or, if capable of being dissolved, it take extraordinarily long time before the solid component is dissolved. Polymerization initiator or polymerization catalyst may be added prior to or on the way of the stirring. Alternatively, the polymerization initiator or polymerization catalyst may be added prior to or after a below-described deaeration step in accordance with the pot life of the material composition.

The stirring time for preparing the material composition using the tank 110 is typically 1 minute to 48 hours, which is more preferably 5 minutes to 24 hours. If the stirring time is short, the material composition is not evenly dispersed. On the other hand, if the stirring time is too long, the polymerization reaction is initiated. The material composition may be stirred within the tank in the atmosphere or in an atmosphere of inactive gas such as nitrogen and argon and under a pressurized or depressurized condition as well as under a normal pressure condition.

The material composition may be prepared using the tank 110 from the first stage. Alternatively, after the material composition is prepared using another tank, the blended material composition may be transferred to the tank 110 to be used.

Further alternatively, a preliminary reaction may be conducted within the tank 110 according to the properties of the material composition. The preliminary reaction may be conducted merely by raising the tank temperature. Alternatively, a small amount of polymerization initiator for the preliminary reaction or polymerization catalyst may be added as necessary. The preliminary reaction reduces a polymerization shrinkage during polymerization molding process to prevent peeling of the mold and the molding material on the way of polymerization. Further, according to the type of the material, transparency of the molded resin can be improved by the preliminary reaction.

After blending the material composition or after completion of the preliminary reaction, deaeration process is typically conducted. The deaeration process eliminates minute air bubbles contained during the stirring process, thereby preventing the air bubbles from residing in the polymerization-cured object to exhibit an unfavorable appearance. Further, when a urethane resin or a thiourethane resin material composition is used, even an extremely small amount of water generates the air-bubble failure during the polymerization molding. The deaeration process also decreases the amount of water contained in the material composition, thereby restraining the air-bubble failure.

The deaeration process is conducted under depressurized condition of 0.001 torr to 100 torr at −10 to 80 degrees Celsius for 1 minute to 24 hours. However, according to the properties of the material composition, excessive depressurization may volatilize monomers contained in the composition. The most appropriate pressure, temperature, time and the like are dependent on the material composition.

After completion of the deaeration process, the material composition within the tank 110 is injected into the cavity of the mold 130 by the material feeder 140 through the material supply tube 142 and the dispenser 141. At this time, the material composition flowing in the material supply tube 142 may be heated by a heater.

Incidentally, a viscometer may be provided in the material supply tube 142 for measuring the viscosity of the material composition in the material supply tube 142 immediately before flowing into the dispenser 141.

The above described exemplary embodiment offers the following advantages.

(1) In the exemplary embodiment, the viscosity of the material composition in the tank 110 is measured in the process of manufacturing the optical goods. In other words, the viscosity of the composition under preparation or under reaction can be contemporarily measured and monitored.

Accordingly, the viscosity of the actual material composition can be recognized, so that an accurate pot life can be determined based on the viscosity immediately before the material composition is injected into the cavity of the mold 130. In other words, since the material composition can be blended and reacted in accordance with the condition of the material composition irrespective of the elapsed time, the subsequent polymerization reaction within the mold can be more reliably conducted and a product with a higher quality can be manufactured.

Further, since the pot life can be determined in accordance with the viscosity even after a long time has elapsed, the material is not wasted and material cost can be reduced.

(2) Since the stirring, the temperature and the like can be controlled in accordance with the viscosity of the material composition actually under preparation or under reaction, the material composition can be more reliably prepared or reacted.

Accordingly, optical goods of higher quality can be manufactured.

(3) In the exemplary embodiment, the viscometer 120 is attached to the tank 110 and the detector 122 is constantly immersed in the material composition (or material) within the tank 110. Further, the measured value is displayed on the display device 123. Accordingly, the viscosity of the material composition in the tank 110 can be constantly measured and monitored.

Thus, it is not necessary to take a part of the material composition out of the tank 110 to measure the viscosity in order to measure the viscosity of the material composition in the tank 110. When the viscosity of the material composition is measured after taking the material composition out of the tank 110, an error may be caused. However, accurate viscosity of the material composition in the tank 110 can be measured. As a result, the viscosity of the material composition can be brought closer to the most appropriate viscosity for being injected into the mold and a product with high quality can be manufactured.

With the use of the manufacturing apparatus, the above advantages can be obtained.

Incidentally, it should be understood that the scope of the invention is not limited to the above exemplary embodiment, but includes modification and improvements as long as an object and advantage of the invention can be attained.

For instance, though the viscometer 120 is attached only to the tank 110, the viscometer 120 may be attached to the material supply tube 142 immediately before the dispenser 141. According to the above arrangement, since the viscosity of the material composition being injected into the mold 130 can be measured and monitored, more accurate pot life can be determined.

A heater may be provided on the material supply tube 142 immediately before the dispenser 141. Accordingly, the viscosity of the material composition can be set at the most appropriate viscosity for being injected into the mold 130. Consequently, since the material composition can be smoothly injected into the mold, mass production can be facilitated.

Further, though only the viscometer 120 is attached to the tank 110, a refractometer may be additionally attached to the tank 110. Accordingly, both of the viscosity and refractive index can be monitored, thus allowing production of mass-producible and high quality products.

EXAMPLE

The advantage(s) of the invention will be described below with reference to Examples, however, the scope of the invention is by no means limited to the Examples.

First Test

In a first test thiourethane resin was used as a plastic lens material to conduct the following experiments.

Example 1

In a reaction container attached with an in-line viscometer ("FVM80A-ST" manufactured by CBC Co. Ltd.), 50.6 parts by mass of m-xylene diisocyanate; 49.4 parts by mass of a compound selected from 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane; 1.25 parts by mass of "SEESORB701" (trade name: manufactured by SHIPRO KASEI KAISHA, LTD.) as an ultraviolet absorber; and 0.085 parts by mass of "Zelec UN" (trade name: manufactured by Stepan Company) were mixed in a total preparation amount of 40 kg of plastic lens material, which were sufficiently stirred to be fully dispersed or dissolved.

Subsequently, 0.004 parts by mass of dimethyltin dichloride and 0.004 parts by mass of N,N-dimethylcyclohexylamine were added to be dissolved by sufficiently stirring at a constant temperature of 30 degrees Celsius, which was placed in a decompressed environment of 5 mmHg for 30 minutes to be deaerated. The mixture at this time was a solution A, which exhibited a viscosity of 15 mPa·s (converted value at 30 degrees Celsius) measured by an in-line viscometer.

The obtained solution A was injected into a lens mold in which a pair of glass die-plates were held by a sealing tape.

Subsequently, the lens mold containing the lens material was heated from 30 degrees Celsius to 120 degrees Celsius in a hot-air furnace and was retained for half an hour at the highest temperature of 120 degrees Celsius. Then, the lens mold was self-cooled to 70 degrees Celsius for 2 hours, and the lens material was removed from the lens mold to obtain a plastic lens as a reaction product.

Example 2

The solution A prepared in the Example 1 was retained at 30 degrees Celsius for 2 hours before being used. The viscosity (converted value at 30 degrees Celsius) measured at this time was 17 mPa·s.

The solution A was injected into a lens mold in which a pair of glass die-plates were held by a sealing tape.

After the same process as the Example 1, a plastic lens as a reaction product was obtained.

Example 3

The solution A prepared in the Example 1 was retained at 30 degrees Celsius for 4 hours before being used. The viscosity (converted value at 30 degrees Celsius) measured at this time was 25 mPa·s.

The solution A was injected into a lens mold in which a pair of glass die-plates were held by a sealing tape.

After the same process as the Example 1, a plastic lens as a reaction product was obtained.

Example 4

The solution A prepared in the Example 1 was retained at 30 degrees Celsius for 6 hours before being used. The viscosity (converted value at 30 degrees Celsius) measured at this time was 56 mPa·s.

The solution A was injected into a lens mold in which a pair of glass die-plates were held by a sealing tape.

After the same process as the Example 1, a plastic lens as a reaction product was obtained.

Example 5

Except that the total amount was 10 kg, the same material was blended at the same ratio as the Example 1, which was subjected to stirring, dissolving and deaerating to prepare a solution B.

Subsequently, the solution B was retained at 30 degrees Celsius for 5 hours before being used. The viscosity (converted value at 30 degrees Celsius) measured at this time was 37 mPa·s.

The solution B was injected into a lens mold in which a pair of glass die-plates were held by a sealing tape.

After the same process as the Example 1, a plastic lens as a reaction product was obtained.

Example 6

The solution B prepared in the Example 5 was retained at 30 degrees Celsius for 6 hours before being used. The viscosity (converted value at 30 degrees Celsius) measured at this time was 52 mPa·s.

The solution B was injected into a lens mold in which a pair of glass die-plates were held by a sealing tape.

After the same process as the Example 1, a plastic lens as a reaction product was obtained.

Example 7

The solution B prepared in the Example 5 was retained at 30 degrees Celsius for 7 hours before being used. The viscosity (converted value at 30 degrees Celsius) measured at this time was 68 mPa·s.

The solution B was injected into a lens mold in which a pair of glass die-plates were held by a sealing tape.

After the same process as the Example 1, a plastic lens as a reaction product was obtained.

Example 8

Except that the total amount was 80 kg, the same material was blended at the same ratio as the Example 1, which was subjected to stirring, dissolving and deaerating to prepare a solution C.

Subsequently, the solution C was retained at 30 degrees Celsius for 5 hours before being used. The viscosity (converted value at 30 degrees Celsius) measured at this time was 51 mPa·s.

The solution C was injected into a lens mold in which a pair of glass die-plates were held by a sealing tape.

After the same process as the Example 1, a plastic lens as a reaction product was obtained.

Example 9

Except that the reaction temperature was 28 degrees Celsius, the same material was blended at the same ratio as the Example 1, which was subjected to stirring, dissolving and deaerating to prepare a solution D.

Subsequently, the solution D was retained at 28 degrees Celsius for 5 hours before being used. The viscosity (converted value at 30 degrees Celsius) measured at this time was 35 mPa·s.

The solution D was injected into a lens mold in which a pair of glass die-plates were held by a sealing tape.

After the same process as the Example 1, a plastic lens as a reaction product was obtained.

Example 10

The solution D prepared in the Example 9 was retained at 28 degrees Celsius for 6 hours before being used. The viscosity (converted value at 30 degrees Celsius) measured at this time was 50 mPa·s.

The solution D was injected into a lens mold in which a pair of glass die-plates were held by a sealing tape.

After the same process as the Example 1, a plastic lens as a reaction product was obtained.

Example 11

The solution D prepared in the Example 9 was retained at 28 degrees Celsius for 7 hours before being used. The viscosity (converted value at 30 degrees Celsius) measured at this time was 66 mPa·s.

The solution D was injected into a lens mold in which a pair of glass die-plates were held by a sealing tape.

After the same process as the Example 1, a plastic lens as a reaction product was obtained.

Example 12

Except that the reaction temperature was 32 degrees Celsius, the same material was blended at the same ratio as the Example 1, which was subjected to stirring, dissolving and deaerating to prepare a solution E.

Subsequently, the solution E was retained at 32 degrees Celsius for 5 hours before being used. The viscosity (converted value at 30 degrees Celsius) measured at this time was 59 mPa·s.

The solution E was injected into a lens mold in which a pair of glass die-plates were held by a sealing tape.

After the same process as the Example 1, a plastic lens as a reaction product was obtained.

Comparison 1

The solution A prepared in the Example 1 was retained at 30 degrees Celsius for 7 hours before being used. The viscosity (converted value at 30 degrees Celsius) measured at this time was 78 mPa·s.

The solution A was injected into a lens mold in which a pair of glass die-plates were held by a sealing tape.

After the same process as the Example 1, a plastic lens as a reaction product was obtained.

Comparison 2

The solution A prepared in the Example 1 was retained at 30 degrees Celsius for 8 hours before being used. The viscosity (converted value at 30 degrees Celsius) measured at this time was 100 mPa·s.

The solution A was injected into a lens mold in which a pair of glass die-plates were held by a sealing tape.

After the same process as the Example 1, a plastic lens as a reaction product was obtained.

Comparison 3

The solution C prepared in the Example 8 was retained at 30 degrees Celsius for 6 hours before being used. The viscosity (converted value at 30 degrees Celsius) measured at this time was 72 mPa·s.

The solution C was injected into a lens mold in which a pair of glass die-plates were held by a sealing tape.

After the same process as the Example 1, a plastic lens as a reaction product was obtained.

Comparison 4

The solution C prepared in the Example 8 was retained at 30 degrees Celsius for 7 hours before being used. The viscosity (converted value at 30 degrees Celsius) measured at this time was 94 mPa·s.

The solution C was injected into a lens mold in which a pair of glass die-plates were held by a sealing tape.

After the same process as the Example 1, a plastic lens as a reaction product was obtained.

Comparison 5

The solution E prepared in the Example 12 was retained at 32 degrees Celsius for 6 hours before being used. The viscosity (converted value at 30 degrees Celsius) measured at this time was 82 mPa·s.

The solution E was injected into a lens mold in which a pair of glass die-plates were held by a sealing tape.

After the same process as the Example 1, a plastic lens as a reaction product was obtained.

Comparison 6

The solution E prepared in the Example 12 was retained at 32 degrees Celsius for 7 hours before being used. The viscosity (converted value at 30 degrees Celsius) measured at this time was 98 mPa·s.

The solution E was injected into a lens mold in which a pair of glass die-plates were held by a sealing tape.

After the same process as the Example 1, a plastic lens as a reaction product was obtained.

Evaluation results of the above Examples 1 to 12 and Comparisons 1 to 6 for injectability and lens appearance are shown in Table 1. Incidentally, according to the traditional time-based pot life management, it was assumed that, when a thiourethane resin was used as the plastic lens material, the resin was usable for 6 hours after adding the catalyst.

The judgment standard is as follows:
Standard for Injectability
A: No Engulfed Bubble
C: Bubbles Engulfed
Standard for Lens Appearance
A: Good
B: Slightly Strained
C: Bad (Significantly Strained)

As shown in Table 1, since the elapsed time after adding the catalyst was 6 hours or less (the usable limit according to traditional pot life management) in the Examples 1 to 6, Examples 8 to 10 and Example 12, appropriate viscosity was obtained at injection and excellent injectability and lens appearance were exhibited.

Further, though the elapsed time after adding the catalyst was 7 hours in the Examples 7 and 11, which exceeded the usable limit according to the traditional pot life management, since appropriate viscosity was obtained at injection, excellent injectability and lens appearance were exhibited.

On the other hand, in Comparisons 1, 2, 4 and 6, since the elapsed time after adding the catalyst exceeded 6 hours and the viscosity at injection was large, at least one of the injectability and the lens appearance was inferior.

In Comparisons 3 and 5, though the elapsed time after adding the catalyst was 6 hours, which was equivalent to the usable limit of the traditional pot life management, excellent lens appearance was not obtained because of the large viscosity at injection.

Incidentally, according to the Examples, it can be deduced that the material composition having 70 mPa·s or less can be used.

Second Test

In a second test, a thioepoxy resin was used as a plastic lens material to conduct the following experiments.

Example 13

In a reaction container attached with an in-line viscometer ("FVM80A-ST" manufactured by CBC Co. Ltd.), 20 parts by mass of sulfur and 80 parts by mass of bis(β-epithiopropyl) sulfide were sufficiently mixed at 65° C. into a total preparation amount of 40 kg to obtain a uniform mixture. Subsequently, after adding 0.5 parts by mass of 2-mercapto-1-methylimidazole, the mixture was subjected to a reaction at 60 degrees Celsius for approximately 60 minutes (preliminary reaction step). Then, the obtained resin composition was cooled to 20 degrees Celsius (cooling step).

TABLE 1

|  | Prepared Amount (kg) · Retained Temperature (° C.) | Elapsed Time after Adding Catalyst (H) | Viscosity at Injection (mPa · s) | Injectability | Lens Appearance |
|---|---|---|---|---|---|
| Example 1 | 40 kg · 30° C. | 0 | 15 | A | A |
| Example 2 | 40 kg · 30° C. | 2 | 17 | A | A |
| Example 3 | 40 kg · 30° C. | 4 | 25 | A | A |
| Example 4 | 40 kg · 30° C. | 6 | 56 | A | A |
| Example 5 | 10 kg · 30° C. | 5 | 37 | A | A |
| Example 6 | 10 kg · 30° C. | 6 | 52 | A | A |
| Example 7 | 10 kg · 30° C. | 7 | 68 | A | A |
| Example 8 | 80 kg · 30° C. | 5 | 51 | A | A |
| Example 9 | 40 kg · 28° C. | 5 | 35 | A | A |
| Example 10 | 40 kg · 28° C. | 6 | 50 | A | A |
| Example 11 | 40 kg · 28° C. | 7 | 66 | A | A |
| Example 12 | 40 kg · 32° C. | 5 | 59 | A | A |
| Comparison 1 | 40 kg · 30° C. | 7 | 78 | A | C |
| Comparison 2 | 40 kg · 30° C. | 8 | 100 | C | C |
| Comparison 3 | 80 kg · 30° C. | 6 | 72 | A | B |
| Comparison 4 | 80 kg · 30° C. | 7 | 94 | C | C |
| Comparison 5 | 40 kg · 32° C. | 6 | 82 | A | C |
| Comparison 6 | 40 kg · 32° C. | 7 | 98 | C | C |

On the other hand, 5 parts by mass of benzyl mercaptan, 0.03 parts by mass of triethyl benzyl ammonium chloride and 0.2 parts by mass of di-n-butyl-tin-dichloride were added and were sufficiently mixed to be uniform, thus obtaining an f solution.

The f solution was added to the cooled resin composition to obtain a uniform resin composition.

Subsequently, the obtained resin composition was subjected to a deaerating process under an environment of 10 torr and 20 degrees Celsius for 10 minutes (deaeration step). The mixture at this time was a solution F, which exhibited a viscosity of 60 mPa·s (converted value at 30 degrees Celsius) measured by an in-line viscometer.

The obtained solution F was injected into a lens mold in which a pair of glass die-plates were held by a sealing tape.

The obtained lens mold containing the lens material was heated from 30 degrees Celsius to 100 degrees Celsius in 20 hours by a hot-air furnace to polymerize and cure the lens material. After self-cooling the lens material to a room temperature, the lens material was removed from the lens mold to obtain a plastic lens as a reaction product.

Example 14

The solution F prepared in the Example 13 was retained at 20 degrees Celsius for 2 hours before being used. The viscosity (converted value at 30 degrees Celsius) measured at this time was 100 mPa·s.

The solution F was injected into a lens mold in which a pair of glass die-plates were held by a sealing tape. After the same process as the Example 13, a plastic lens as a reaction product was obtained.

Example 15

The solution F prepared in the Example 13 was retained at 20 degrees Celsius for 3 hours before being used. The viscosity (converted value at 30 degrees Celsius) measured at this time was 120 mPa·s.

The solution F was injected into a lens mold in which a pair of glass die-plates were held by a sealing tape. After the same process as the Example 13, a plastic lens as a reaction product was obtained.

Example 16

The solution F prepared in the Example 13 was retained at 15 degrees Celsius for 2 hours before being used. The viscosity (converted value at 30 degrees Celsius) measured at this time was 90 mPa·s.

The solution F was injected into a lens mold in which a pair of glass die-plates were held by a sealing tape. After the same process as the Example 13, a plastic lens as a reaction product was obtained.

Example 17

The solution F prepared in the Example 13 was retained at 15 degrees Celsius for 3 hours before being used. The viscosity (converted value at 30 degrees Celsius) measured at this time was 110 mPa·s.

The solution F was injected into a lens mold in which a pair of glass die-plates were held by a sealing tape. After the same process as the Example 13, a plastic lens as a reaction product was obtained.

Example 18

The solution F prepared in the Example 13 was retained at 15 degrees Celsius for 4 hours before being used. The viscosity (converted value at 30 degrees Celsius) measured at this time was 130 mPa·s.

The solution F was injected into a lens mold in which a pair of glass die-plates were held by a sealing tape. After the same process as the Example 13, a plastic lens as a reaction product was obtained.

Example 19

The solution F prepared in the Example 13 was retained at 25 degrees Celsius for 2 hours before being used. The viscosity (converted value at 30 degrees Celsius) measured at this time was 120 mPa·s.

The solution F was injected into a lens mold in which a pair of glass die-plates were held by a sealing tape. After the same process as the Example 13, a plastic lens as a reaction product was obtained.

Comparison 7

The solution F prepared in the Example 13 was retained at 20 degrees Celsius for 4 hours before being used. The viscosity (converted value at 30 degrees Celsius) measured at this time was 140 mPa·s.

The solution F was injected into a lens mold in which a pair of glass die-plates were held by a sealing tape. After the same process as the Example 13, a plastic lens as a reaction product was obtained.

Comparison 8

The solution F prepared in the Example 13 was retained at 25 degrees Celsius for 3 hours before being used. The viscosity (converted value at 30 degrees Celsius) measured at this time was 140 mPa·s.

The solution F was injected into a lens mold in which a pair of glass die-plates were held by a sealing tape. After the same process as the Example 13, a plastic lens as a reaction product was obtained.

Comparison 9

The solution F prepared in the Example 13 was retained at 25 degrees Celsius for 4 hours before being used. The viscosity (converted value at 30 degrees Celsius) measured at this time was 160 mPa·s.

The solution F was injected into a lens mold in which a pair of glass die-plates were held by a sealing tape. After the same process as the Example 13, a plastic lens as a reaction product was obtained.

Evaluation results of the above Examples 13 to 19 and Comparisons 7 to 9 for injectability and lens appearance are shown in Table 2. Incidentally, according to the traditional time-based pot life management, it was assumed that, when a thioepoxy resin was used as the plastic lens material, the resin was usable for 3 hours after adding the catalyst.

The judgment standard was that of the same as the first test.

TABLE 2

| | Material Retaining Temperature (° C.) | Elapsed Time after Adding Catalyst (H) | Viscosity at Injection (mPa · s) | Injectability | Lens Appearance |
|---|---|---|---|---|---|
| Example 13 | 20 | 0 | 60 | A | A |
| Example 14 | 20 | 2 | 100 | A | A |
| Example 15 | 20 | 3 | 120 | A | A |
| Example 16 | 15 | 2 | 90 | A | A |
| Example 17 | 15 | 3 | 110 | A | A |
| Example 18 | 15 | 4 | 130 | A | A |
| Example 19 | 25 | 2 | 120 | A | A |
| Comparison 7 | 20 | 4 | 140 | C | B |
| Comparison 8 | 25 | 3 | 140 | C | B |
| Comparison 9 | 25 | 4 | 160 | C | C |

As shown in Table 2, since the elapsed time after adding the catalyst was 3 hours or less (the usable limit according to traditional pot life management) in the Examples 13 to 17 and Example 19, appropriate viscosity was obtained at injection and excellent injectability and lens appearance were exhibited.

Further, though the elapsed time after adding the catalyst was 4 hours in the Example 18, which exceeded 3 hours or less, i.e. the usable limit according to traditional pot life management, since appropriate viscosity was obtained at injection, excellent injectability and lens appearance were exhibited.

On the other hand, in Comparisons 7 and 9, since the elapsed time after adding the catalyst exceeded 3 hours and the viscosity at injection was large, at least one of the injectability and the lens appearance was inferior.

In Comparison 8, though the elapsed time after adding the catalyst was 3 hours, which was equivalent to the usable limit of the traditional pot life management, excellent lens appearance was not obtained because of the large viscosity at injection.

Incidentally, according to the Examples, it can be deduced that the material composition having 130 mPa·s or less can be used.

According to the above tests, it has been shown that, even when the material composition exceeded the usable limit of the traditional pot life management, the material composition may still be usable in accordance with the viscosity at injection. Accordingly, the material is not wasted by determining the pot life in accordance with the viscosity at injection. On the other hand, the defective fraction can be reduced by determining the material composition as unusable that exhibits a large viscosity at injection and therefore may produce a defective product even when the usable limit of the material composition has not been lapsed.

The invention is applicable to optical goods including a plastic lens such as a spectacle lens, prism, optical fiber, information-recording substrate and filter, and further to an adhesive.

What is claimed is:

1. A manufacturing method of optical goods, comprising:
generating a material composition by blending a material stored in a tank;
injecting the material composition into a cavity provided inside a mold; and
polymerizing and curing the injected material composition, wherein
a viscosity of the material composition is measured after generating the material composition but before the material composition is injected into the cavity,
whether the material composition is injected or not is determined based on a result of the measurement of the viscosity,
when it is determined that the material composition is adapted to be injected, the injection and the polymerization/curing of the material composition are conducted, and
when it is determined that the material composition is not adapted to be injected, none of the injecting and the polymerizing/curing of the material composition is conducted.

2. The manufacturing method of optical goods according to claim 1, wherein the viscosity is measured by a viscometer having a detector immersed in the material composition stored in the tank.

3. The manufacturing method of optical goods according to claim 1, wherein
the viscosity of the material composition is measured while generating the material composition, and
stirring of the material composition stored in the tank is controlled in accordance with the viscosity.

4. The manufacturing method of optical goods according to claim 1, wherein
the viscosity of the material composition is measured while generating the material composition, and
a temperature of the material composition stored in the tank is controlled in accordance with the viscosity.

* * * * *